United States Patent [19]

Sehring et al.

[11] 3,896,192

[45] July 22, 1975

[54] PROCESS FOR THE PREPARATION OF THIONOPHOSPHORIC AND THIONOPHOSPHONIC ACID ESTERS

[75] Inventors: Richard Sehring; Wolfgang Buck, both of Ingelheim am Rhein, Germany

[73] Assignee: Boehringer Ingelheim GmbH, Ingelheim am Rhein, Germany

[22] Filed: Aug. 2, 1973

[21] Appl. No.: 385,065

Related U.S. Application Data

[63] Continuation-in-part of Ser. No. 329,463, Feb. 5, 1973, abandoned.

[30] Foreign Application Priority Data

Feb. 7, 1972 Germany............................ 2205565
May 9, 1972 Germany............................ 2222578

[52] U.S. Cl................................. 260/982; 260/982

[51] Int. Cl.[2]...................... C07F 9/165; C07F 9/40
[58] Field of Search.................................. 260/982

[56] References Cited
UNITED STATES PATENTS 3,272,892 9/1966 Szabo................................ 260/982
3,422,453 1/1969 Frank............................ 260/982 X

*Primary Examiner*—Richard L. Raymond
*Attorney, Agent, or Firm*—Hammond & Littell

[57] ABSTRACT

A process for the preparation of certain esters of thionophosphoric and thionophosphonic acid, which comprises subjecting a thionophosphoric or thionophosphonic acid diphenyl ester to an ester exchange reaction with a lower alkanol in the presence of a base.

5 Claims, No Drawings

PROCESS FOR THE PREPARATION OF THIONOPHOSPHORIC AND THIONOPHOSPHONIC ACID ESTERS

This is a continuation-in-part of copending application Ser. No. 329,463, filed Feb. 5, 1973, now abandoned.

This invention relates to a novel process for the preparation of certain monophenyl esters of thionophosphoric and thionophosphonic acids by subjecting a corresponding thionophosphoric or thionophosphonic acid diphenyl ester to an ester exchange reaction with a lower alkanol in the presence of a base.

More particularly, the present invention relates to a novel process for the preparation of compounds of the formula

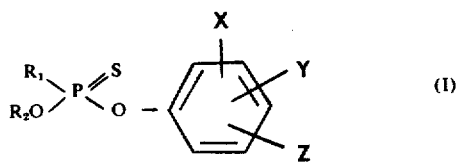

wherein
$R_1$ is lower alkyl, chloro-lower alkyl, phenyl, halophenyl, lower alkyl-phenyl or R—O—,
where R is alkyl of 1 to 12 carbon atoms, alkoxyalkyl of 2 to 12 carbon atoms, alkenyl of 3 to 12 carbon atoms, or (alkyl of 1 to 12 carbon atoms)—COOR', where R' is lower alkyl,
$R_2$ is lower alkyl,
X and Y, which may be identical to or different from each other, are each hydrogen, chlorine, bromine, iodine, lower alkyl or nitro, and
Z is hydrogen, chlorine, bromine, iodine, lower alkyl, nitro, cyano, acetyl or —S(O)$_n$R'', where R'' is lower alkyl and $n$ is 0, 1 or 2.

The novel process pursuant to the present invention is particularly well suited for the preparation of those compounds of the formula I wherein $R_1$ is R—O— and R and $R_2$ are different from each other. The novel process produces very good yields of these compounds, whereas heretofore known processes produced them with only mediocre yields.

Substituent $R_1$ in formula I above is preferably methyl, ethyl, phenyl or chloromethyl and, if it takes on the meaning R—O—, R contains preferably 1 to 8 and especially 1 to 4 carbon atoms.

Substituent $R_2$ is most preferably methyl or ethyl.

Finally, X, Y and Z are preferably attached to the 2-, 4- and 5-positions on the phenyl ring, and to the extent that they represent lower alkyl, they are preferably methyl.

The compounds embraced by formula I are useful as pesticides, particularly as insecticides and acaricides, and also as intermediates for the preparation of other pesticides.

BACKGROUND OF THE INVENTION

Thionophosphoric acid esters of the type embraced by formula I have heretofore usually been prepared from a corresponding 0,0-dialkyl-thionophosphoric acid chloride of the formula

where the alkyl substituents are identical to or different from each other, by reacting the phosphoric acid chloride with the desired phenolate or with the corresponding phenol in the presence of an acid-binding agent.

The major disadvantage of this process is that it requires the acid chlorides of the formula II as starting materials; some of these compounds are difficultly accessible on a technical scale. Their yields are very poor, especially when the two alkyl substituents are different. The purity of the technical grade acid chlorides is mediocre and, especially when one of the alkyl substituents is methyl, they are thermally unstable. In the technical scale process for their preparation, moreover, a significant and interfering amount of thiophosphoric acid trialkyl ester is always formed as a side product, and some of the starting material remains unchanged. The separation of the mixtures thus obtained is difficult and involves considerable losses. Thus, the poor accessibility of the starting compounds of the formula II appears to be the principal reason for the fact that no 0,0-dialkyl-0-phenyl-thionophosphoric acid esters with different alkyl substituents have yet become commercially available, although their excellent pesticidal properties have long been recognized.

The customary process for the synthesis of the thionophosphonic acid esters embraced by formula I has similar disadvantages. They are prepared by starting from a corresponding thionophosphonic acid dichloride which is first reacted with an alcohol to form a compound of the formula

which is subsequently reacted with the desired phenolate or the corresponding phenol in the presence of an acid-binding agent to form the thionophosphonic acid ester.

Here again, the disadvantage of this synthesis resides in the poor yields of the compounds of the formula III. When the thionophosphonic acid dichloride is reacted with an alkanol, especially with methanol or ethanol, a significant and interfering amount of the thionophosphonic acid dialkyl ester is always formed, while some of the thionophosphonic acid dichloride does not react at all. The separation of the mixture formed thereby is difficult and results in considerable losses.

OBJECTS OF THE INVENTION

It is an object of the present invention to provide a process for synthesizing compounds of the formula I, which uses readily accessible starting materials and produces the desired end products of a high degree of purity and with good yields.

Other objects and advantages of the present invention will become apparent as the description thereof proceeds.

THE INVENTION

The above objects are achieved in accordance with the present invention by first reacting a thionophosphonic or thionophosphoric acid dichloride of the formula

wherein $R_1$ has the same meanings as in formula I, with a phenol or phenolate of the formula

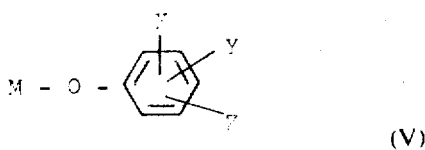

(V)

wherein X, Y and Z have the same meanings as in formula I and M is hydrogen or one equivalent of a cation, preferably an alkali metal cation, to form as an intermediate a thionophosphonic or thionophosphoric acid diphenyl ester of the formula

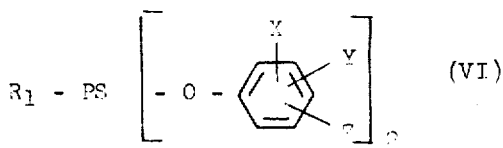

(VI)

wherein $R_1$, X, Y and Z have the meanings previously defined, and subsequently reacting said intermediate with a lower alkanol of the formula

(VII)

wherein $R_2$ has the same meaning as in formula I, in the presence of a base, whereby a trans-esterification or ester exchange reaction occurs and one of the two phenoxy groups in the intermediate VI is replaced by the substituent $R_2O—$, forming a corresponding compound of the formula I.

Suitable embodiments of the base, which serves as the catalyst for the trans-esterification, include alkali metal alcoholates of the particular lower alkanol dissolved in said lower alkanol, as well as solutions of alkali metal hydroxides in water or in said lower alkanol. Organic tertiary amines, such as triethylamine, also effectively catalyze the ester exchange. The alkali metal alcoholate or alkali metal hydroxide is employed in molar amount.

Surprisingly, the trans-esterification leads to the exchange of only one phenoxy substituent in the intermediate for one $R_2O$-substituent, even if the alcohol $R_2OH$ is present in large excess. The trans-esterification reaction with the above strong basic catalysts may be performed at elevated temperatures as well as in the cold, but a reaction temperature below room temperature is preferred. Even at $-10°C$ the trans-esterification goes to completion in about 2 to 4 hours. If desired or necessary, an inert organic solvent, such as benzene, toluene, an ether, a ketone or a halogenated hydrocarbon, may be added to the reaction mixture.

More particularly, the ester exchange reaction procedure under these conditions is generally as follows: The starting compound of the formula VI is dissolved in the particular alcohol selected for the alcoholysis, optionally with addition of a further solvent, and then, while stirring the resulting solution at room temperature or a lower temperature, a solution of a molar amount of the alkali metal alcoholate in the particular alcohol or of the alkali metal hydroxide in the particular alcohol or in water is added dropwise thereto.

The progress of the reaction can be followed or monitored by thin-layer chromatography (on silicage) plates with irridescent material, using as the flow agent toluene : n-heptane : chloroform = 2:2:1) and by titration of the unconsumed amount of alkali. After completion of the reaction, the reaction mixture is made weakly acid and is then evaporated in vacuo. The residue is taken up in a suitable solvent medium, and the phenol released by the reaction is separated from the solution by extraction with sodium hydroxide and subsequently recovered.

If necessary, the thionophosphonic or thionophosphoric acid ester of the formula I isolated from the organic phase may be purified by recrystallization or distillation, depending upon its physical characteristics.

The trans-esterification above referred to also proceeds in the presence of a weaker base, such as a phenolate of the formula V, where M is sodium or potassium, or dry gaseous ammonia, although longer reaction periods at higher temperatures under reflux or pressure are required for completion of the reaction.

The performance of the trans-esterification in the presence of dry gaseous ammonia as the basic catalyst has proved to be especially advantageous for the following reasons: Ammonia does not react with the thionophosphoric acid diphenyl esters in inert solvents under the reaction conditions. In the presence of lower alkanols, such as methanol or ethanol, ammonia promotes the trans-esterification of the thionophosphonic and thionophosphoric acid diphenyl esters of the formula VI without discernable amidation of these esters. Although the trans-esterification in the presence of ammonia proceeds somewhat slower than in the presence of the stronger basic alkali metal alcoholates, it is more selective; in other words, the desired end product of the formula I is obtained with greater yields, and the raw product has a higher degree of purity. Moreover, ammonia is a relatively inexpensive chemical, and the preparation of the alkali metal alcoholate from ethanol and sodium, for example, is avoided. In comparison to a tertiary amine, ammonia has the advantage that it is not quaternized by the 0-alkyl-0-phenyl-thionophosphonic or 0,0-dialkyl-0-phenyl-thionophosphoric acid esters; the yield of these reaction products is significantly reduced due to formation of quaternary side products when the trans-esterification is carried out in the presence of a stronger basic trialkylamine, such as triethylamine.

More particularly, the trans-esterification in the presence of ammonia is effected by dissolving the diphenyl ester of the formula VI in a suitable inert organic solvent, such as toluene, trichloroethylene, ethylene chloride or chloroform, admixing the solution with a large excess of the lower alkanol of the formula VII, and thereafter either passing dry gaseous ammonia through the resulting mixture at a temperature between about $-20°$ and $+100°C$, preferably at room temperature, until the reaction has gone to completion, or placing the mixture into an autoclave and pressurizing it with dry gaseous ammonia to a pressure of about 3–5 atmospheres gauge. The trans-esterification proceeds more rapidly in the pressurized autoclave than at atmospheric pressure.

The progress of the reaction may be monitored by thin-layer chromatography, as described above, or by observing the pressure drop in the autoclave. The required reaction time depends upon the reactivity of the starting compound and the reaction conditions, and varied from 2 to 20 hours.

The phenol released by the trans-esterification is recovered by extraction of the reaction mixture with sodium hydroxide.

The desired end product of the formula I is obtained by evaporation of the organic phase after the sodium hydroxide extraction. The end product is obtained in sufficiently pure form for direct use as a pesticide, but it may be further purified, if desired, by distillation and/or recrystallization.

The starting compounds of the formula IV are known compounds and may be prepared by conventional methods.

The following examples further illustrate the present invention and will enable others skilled in the art to understand it more completely. It should be understood, however, that the invention is not limited solely to the particular examples given below.

EXAMPLE 1

Benzenethionophosphonic acid-0-methyl-0-(4-bromo-2,5-dichloro-phenyl)-ester

A solution of 2.7 gm of sodium methylate (0.05 mol) in 20 ml of methanol was added dropwise to a solution of 31 gm of benzenethionophosphonic acid-0,0-di-(4-bromo-2,5-dichloro-phenyl)-ester (0.05 mol) in 100ml of dichloroethane, while stirring and cooling to maintain a temperature range of −3° to 0°C. After stirring the mixed solution for one hour within that temperature range, the reaction mixture was poured into ice water. The dichloroethane phase was separated, extracted first with 1 N sodium hydroxide and then with water, dried and evaporated, leaving 20 gm (97% of theory) of a yellowish, oily residue which was purified by distillation. After a small preliminary fraction, 16 gm (77.5% of theory) of a colorless oil passed over between 185°–190°C at 0.1 mm Hg; the oil solidified upon standing for some time, and the substance had a melting point of 70°–71°C after recrystallization from methanol. It was identified to be the compound of the formula

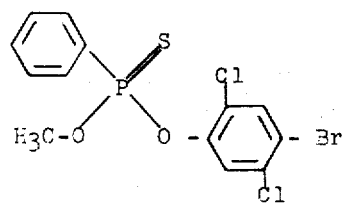

EXAMPLE 2

Methanethionophosphonic acid-0-methyl-0-(4-bromo-2,5-dichloro-phenyl)-ester

A solution of 10.8 gm of sodium methylate (0.2 mol) in 100 ml of methanol was added dropwise to a solution of 112 gm (0.2 mol) of methanethionophosphonic acid-0,0-di-(4-bromo-2,5-dichloro-phenyl)-ester in 150 ml of methylene chloride at 0°C, while stirring. After stirring the mixture for 30 minutes at 0°C, the reaction mixture was poured into 600 ml of ice water, and the organic phase was separated and extracted first with 250 ml of 1N sodium hydroxide and then with water. 44 gm of 4-bromo-2,5-dichloro-phenol were recovered by acidifying the aqueous phase. The organic phase was dried and evaporated, leaving 61 gm (87.5% of theory) of a yellowish, oily residue which was purified by vacuum distillation, whereupon it had a boiling point of 143°–145°C at 0.03 mm Hg. It was identified to be the compound of the formula

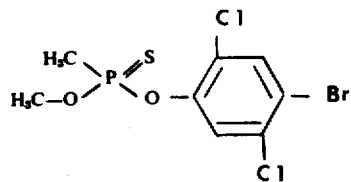

EXAMPLE 3

Methanethionophosphonic acid-0-ethyl-0-(2,5-dichloro-4-methylmercapto-phenyl)-ester A solution of 1.15 gm of sodium in 30 ml of ethanol was added dropwise to a solution of 24.7 gm (0.05 mol) of methanethionophosphonic acid-0,0-di-(2,5-dichloro-4-methylmercapto-phenyl)-ester in 200 ml of methylene chloride at 0°C, accompanied by stirring. The resulting reaction mixture was then made weakly acid and subsequently evaporated. The residue was taken up in toluene, and the resulting solution was extracted first with 2N sodium hydroxide and then with water. 2,5-dichloro-4-methylmercapto-phenol was recovered from the aqueous phase. The toluene phase was evaporated, leaving 16.0 gm (97% of theory) of a colorless, viscous oil which upon purification by vacuum distillation had a boiling point of 154°–156°C at 0.1 mm Hg.

The oily product crystallized upon standing for a long time, and the crystalline product had a melting point of 50°–51°C after recrystallization from ethanol. By means of thin-layer chromatography and nuclear resonance spectrum it was identified to be the compound of the formula

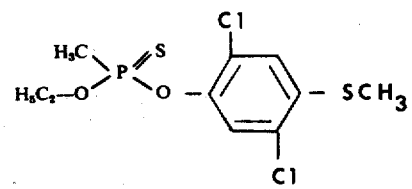

EXAMPLE 4

Chloromethanethionophosphonic acid-0-ethyl-0-(2,5-dichloro-4-methylmercapto-phenyl)-ester 15.85 gm (0.03 mol) of chloromethanethionophosphonic acid-0,0-di-(2,5-dichloro-4-methylmercapto-phenyl)-ester were dissolved in a mixture of 70 ml of tetrahydrofuran and 100 ml of ethanol, the solution was cooled to −10°C, and at that temperature a solution of 1.2 gm (0.03 mol) of sodium hydroxide in a mixture of 2.5 ml of water and 50 ml of ethanol was added dropwise thereto. The resulting reaction mixture was allowed to stand overnight at −8°C and was thereafter made acid and evaporated. The residue was taken up in toluene, the resulting solution was extracted with aqueous alkali, and the toluene phase was evaporated. 9 gm (82% of theory) of a colorless oil remained behind, which was purified by vacuum distillation, whereupon it had a b.p. of 170°–173°C at 0.1 mm Hg; it crystallized after prolonged standing and then had a melting point of 37°–39°C. It was identified to be the compound of the formula

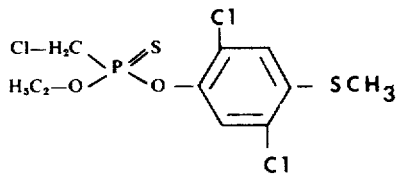

The procedures described in Examples 1 to 4 also yielded the following thionophosphonic acid esters, starting from the corresponding thionophosphonic acid-0,0-diphenyl ester:

a. Methanethionophosphonic acid-0-ethyl-0-(2,4,5-trichloro-phenyl)-ester, $n_D^{25}$ : 1.5754;
b. Ethanethionophosphonic acid-0-ethyl-0-(2,5-dichloro-4-methylmercapto-phenyl)-ester, m.p. 44°–45°C;
c. Ethanethionophosphonic acid-0-ethyl-0-(2,4,5-trichloro-phenyl)-ester, b.p. 118°–121°C at 0.1 mm Hg;
d. Methanethionophosphonic acid-0-ethyl-0-(2,5-dichloro-4-sulfonylmethyl-phenyl)-ester, m.p. 76°–78°C;
e. Methanethionophosphonic acid-0-ethyl-0-(2,5-dichloro-4-ethylmercapto-phenyl, $n_D^{25}$ : 1.5911;
f. Methanethionophosphonic acid-0-ethyl-0-(4-bromo-2,5-dichloro-phenyl)-ester, $n_D^{20}$ : 1.5841;
g. Methanethionophosphonic acid-0-ethyl-0-(4-acetyl-2,5-dichloro-phenyl)-ester, $n_D^{25}$ : 1,5852;
h. Benzenethionophosphonic acid-0-ethyl-0-(4-bromo-2,5-dichloro-phenyl)-ester, m.p. 63°C;
i. Methanethionophosphonic acid-0-isopropyl-0-(4-bromo-2,5-dichloro-phenyl)-ester, m.p. 51°C;
j. Methanethionophosphonic acid-0-n-propyl-0-(4-bromo-2,5-dichloro-phenyl)-ester, m.p. 50°–51°C;
k. Methanethionophosphonic acid-0-methyl-0-(3-methyl-4-methylmercapto-phenyl)-ester, b.p. 96°C at 0.1 mm Hg;
l. Methanethionophosphonic acid-0-ethyl-0-(4-methylmercapto-phenyl)-ester, $n_D^{25}$ : 1.5874;
m. Methanethionophosphonic acid-0-methyl-0-(2,4-dichloro-phenyl)-ester, b.p. 102°–104°C at 0.2 mm Hg;
n. Chloromethanethionophosphonic acid-0-isopropyl-0-(2,4-dichloro-phenyl)-ester;
o. Methanethionophosphonic acid-0-ethyl-0-(4-cyano-phenyl)-ester, $n_D^{20}$ : 1.5558;
p. Chloromethanethionophosphonic acid-0-ethyl-0-(4-cyano-phenyl)-ester; and
q. Benzenethionophosphonic acid-0-ethyl-0-(4-nitro-phenyl)-ester, m.p. 36°C.

EXAMPLE 5

Thionophosphoric acid-0-ethyl-0-methyl-0-(4-bromo-2,5-dichloro-phenyl)-ester a. A solution of 17 gm (0.42 mol) of caustic soda in 40 ml of water was added dropwise to a solution of 36 gm of thiophosphoric acid-0-ethyl ester dichloride (0.2 mol) and 102 gm of 4-bromo-2,5-dichloro-phenol (0.42 mol) in 100 ml of ethylene chloride at 20°–30°C, accompanied by stirring. The resulting mixture was stirred for 30 minutes at 20° to 30°C and then for one hour at 70°–80°C, and was thereafter allowed to cool. The organic phase was now separated, extracted with 1N sodium hydroxide and then with water, dried and evaporated. 108 gm (91% of theory) of a colorless, oily residue were obtained which solidified upon standing. After recrystallization from gasoline the solid product had a melting point of 59°–62°C; it was identified to be thionophosphoric acid-0-ethyl-0,0-di-(4-bromo-2,5-dichloro-phenyl)-ester.

b. 96 gm (0.162 mol) of the product obtained in (a) were dissolved in 200 ml of ethylene chloride, the solution was cooled to 0°C and, while maintaining that temperature and stirring, a solution of 4.1 gm of sodium in 100 ml of methanol was added dropwise thereto. The resulting reaction mixture was stirred for one more hour at 0°C and was then poured into one liter of ice water which had been acidified with 25 ml of concentrated hydrochloric acid. After thorough mixing, the organic phase was separated, extracted first with 250 ml of sodium hydroxide and then with water, dried and evaporated. 61 gm (99% of theory) of an oily residue were obtained, which was purified by distillation in vacuo; between 150° and 152°C at 0.01 mm Hg 49 gm (80% of theory) of a colorless oil, $n_D^{20}$ : 1.5674, distilled over. It was identified to be the compound of the formula

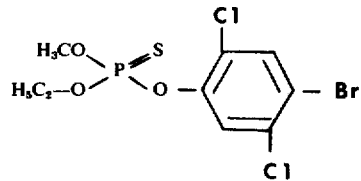

Analysis: Calculated: Total halogen — 39.8%; P — 8.15%. Found: Total halogen — 39.4%; P — 8.04%.

In like manner the following additional thionophosphoric acid esters were prepared:

r. Thionophosphoric acid-0-methyl-0-ethyl-0-(2,5-dichloro-4-methylmercapto-phenyl)-ester of the formula

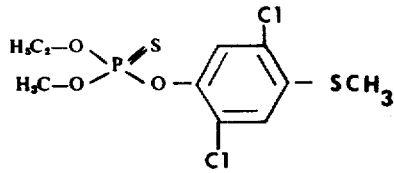

a colorless oil, b.p. 150°–160°C at 0.01, $n_D^{20}$ = 1.5804.
Analysis: Calculated: Cl — 20.5%; P — 8.9%. Found: Cl — 22.6%; P — 8.7%.

s. Thionophosphoric acid-0-methyl-0-ethyl-0-(2,4,5-trichloro-phenyl)-ester of the formula

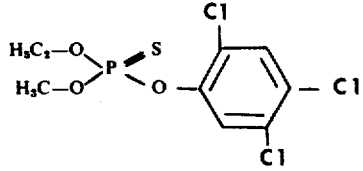

a colorless oil, $n_D^{20}$ = 1.5580.
Analysis: Calculated: Cl — 31.6%; P — 9.22%. Found: Cl — 30.7%; P — 8.9%.

t. Thionophosphoric acid-0-methyl-0-n-butyl-0-(2,5-dichloro-4-bromo-phenyl)-ester of the formula

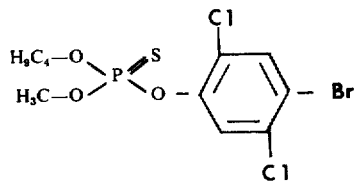

a colorless oil.
Analysis: Calculated: Total halogen — 36.9%; P — 7.57%. Found: Total halogen — 35.0%; P — 7.5%.

u. Thionophosphoric acid-0-methyl-0-ethyl-0-(2,4-dichloro-phenyl)-ester of the formula

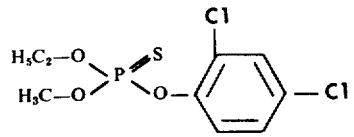

a colorless oil, $n_D^{20} = 1.5432$.
Analysis: Calculated: Cl — 23.6%. Found: Cl — 24.0%.

v. Thionophosphoric acid-0-methyl-0-ethyl-0-(2,5-dichloro-phenyl)-ester of the formula

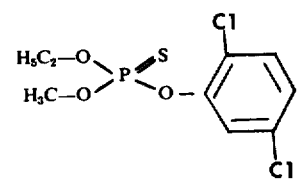

a colorless oil, $n_D^{20} = 1.5438$.

w. Thionophosphoric acid-0,0-diethyl-0-(2,5-dichloro-4-bromo-phenyl)-ester of the formula

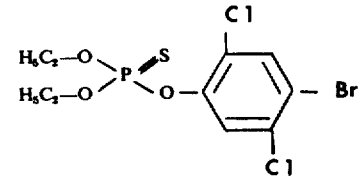

a colorless oil, $n_D^{20} = 1.5581$.
Analysis: Calculated: Total halogen — 38.2%. Found: Total halogen — 38.5%.

x. Thionophosphoric acid-0-methyl-0-(ethoxy-carbonylmethyl)-0-(2,5-dichloro-4-methylmercapto-phenyl)-ester of the formula

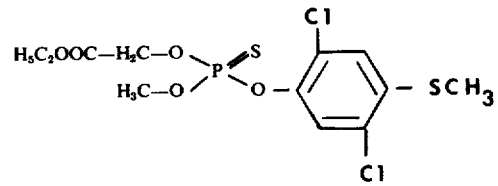

a colorless oil.
Analysis: Calculated: Cl — 17.5%. Found: Cl — 16.9%.

y. Thionophosphoric acid-0-methyl-0-(ethoxy-ethyl)-0-(2,5-dichloro-4-methylmercapto)-ester of the formula

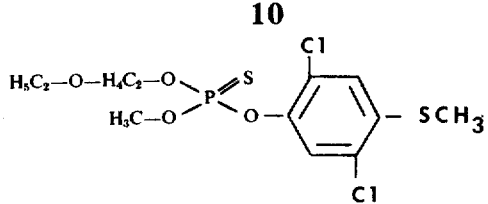

Analysis: Calculated: Cl — 18.2%. Found: Cl — 17.5%.

z. Thionophosphoric acid-0-methyl-0-(ethoxy-ethyl)-0-(2,5-dichloro-4-bromo-phenyl)-ester of the formula

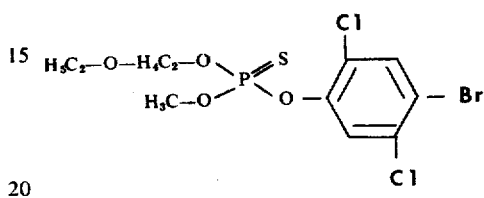

a colorless oil, $n_D^{20} = 1.5568$.

EXAMPLE 6

Benzenethionophosphonic acid
0-methyl-0-(4-bromo-2,5-dichloro-phenyl)-ester 124.4 gm (0.2 mol) of benzenethionophosphonic acid 0,0-bis-(4-bromo-2,5-dichloro-phenyl)-ester (m.p. 124°–126°C) were dissolved in a mixture consisting of 800 ml of trichloroethylene and 200 ml of methanol, and, while stirring the solution at room temperature, dry gaseous ammonia was passed therethrough, first relatively rapidly and then more slowly, so that only a little ammonia passed through the condenser connected to the exhaust of reaction vessel. The reaction went to completion after 4 to 5 hours, whereupon the reaction solution was evaporated, the residue was taken up in about 500 ml of methylene chloride, and the resulting solution was extracted with 2 N sodium hydroxide, dried and again evaporated. 49 gm of 4-bromo-2,5-dichlorophenol were recovered from the aqueous extract. The residue of the evaporation of the organic phase was yellow oil which solidified into a white crystalline mass having a melting point of 69°–72°C. The yield of raw product was 81 gm (98.3% of theory). Gas-chromatograhic determination showed that the raw product contained more than 95% of pure benzenethionophosphonic acid 0-methyl-0-(4-bromo-2,5-dichloro-phenyl)-ester and no starting material; after recrystallization from isopropanol the product had a melting point of 74°–75°C.

EXAMPLE 7

Methanethionophosphonic acid
0-ethyl-0-(2,5-dichloro-4-methylmercapto-phenyl)-ester 24.7 gm (0.05 mol) of methanethionophosphonic acid 0,0-bis-(2,5-dichloro-4-methylmercapto-phenyl)-ester were dissolved in 400 ml of toluene, and 100 ml of ethanol were added to the solution. The resulting solution was introduced into an autoclave which was then pressurized with dry gaseous ammonia to 5 atmospheres gauge. After standing for five hours at room temperature, the internal pressure of the autoclave had dropped to 3.8 atmospheres gauge, and the transesterification had gone to completion. The reaction mixture was now evaporated, the residue was taken up in toluene, and the resulting solution was extracted with 2 N sodium hydroxide to remove the 2,5-dichloro-4-methylmercapto-phenol released by the reaction. The organic phase was dried and evaporated, yielding 14.3 gm (87% of theory) of methanethionophosphonic acid 0-ethyl-0-(2,5-dichloro-4-methylmercapto-phenyl)-ester in the form of a light-brown oil which was purified by molecular distillation and then had a boiling point of 130°C at 0.001 mm Hg.

EXAMPLE 8

24.7 gm (0.05 mol) of methanethionophosphonic acid 0,0-bis-(2,5-dichloro-4-methylmercapto-phenyl)-ester were dissolved in 400 ml of trichloroethylene, 200 ml of ethanol were added to the solution and, while stirring the mixture at room temperature, dry gaseous ammonia was slowly passed therethrough. After about 20 hours no more starting compound could be detected in the reaction mixture by thin-layer chromatography. The reaction mixture was worked up as described in Example 7, yielding 16.2 gm (98% of theory) of methanethionophosphonic acid 0-ethyl-0-(2,5-dichloro-4-methylmercapto-phenyl)-ester in the form of a light-yellow oil which was purified by molecular distillation and then had a boiling point of 130°C at 0.001 mm Hg; $n_D^{20} = 1.5962$.

EXAMPLE 9

0-Methyl-0-ethyl-0-(4-bromo-2,5-dichloro-phenyl) thionophosphate 30 gm of 0-ethyl-0,0-bis-(4-bromo-2,5-dichloro-phenyl) thionophosphate (m.p. 67°C) were dissolved in a mixture consisting of 300 ml of trichloroethylene and 70 ml of methanol, and, while stirring the solution at room temperature, dry gaseous ammonia was passed therethrough. The process of the reaction was monitored by thin-layer chromatography; after 24 hours no more starting compound was present in the reaction mixture. The solvent was now distilled off, and the residue was extracted with dilute sodium hydroxide and water, leaving 18 gm (93.5% of theory) of 0-methyl-0-ethyl-0-(4-bromo-2,5-dichloro-phenyl) thionophosphate, b.p. 150°-153°C at 0.01 mm Hg; $n_D^{20} = 1.5674$.

EXAMPLE 10

Using a procedure analogous to that described in Example 9, 0-methyl-0-n-butyl-0-(4-bromo-2,5-dichloro-phenyl) thionophosphate, b.p. 161°C at 0.01 mm Hg, was prepared from 0-n-butyl-0,0-bis-(4-bromo-2,5-dichloro-phenyl)-thionophosphate (m.p. 38°C). The yield was 91% of theory.

EXAMPLE 11

Using a procedure analogous to that described in Example 9, 0-methyl-0-ethyl-0-(2,4,5-trichloro-phenyl) thionophosphate, a colorless oil, $n_D^{20} = 1.5580$, was prepared from 0-ethyl-0,0-bis-(2,4,5-trichloro-phenyl) thionophosphate.

EXAMPLE 12

Using a procedure analogous to that described in Example 9, 0-methyl-0-ethyl-0-(2,5-dichloro-4-methylmercapto-phenyl) thionophosphate was prepared from 0-ethyl-0,0-bis-(2,5-dichloro-4-methylmercapto-phenyl) thionophosphate.

EXAMPLE 13

Using a procedure analogous to that described in Example 9, 0-methyl-0-ethyl-0-(2,5-dichloro-4-iodo-phenyl) thionophosphate was prepared from 0-ethyl-0,0-bis-(2,5-dichloro-4-iodo-phenyl) thionophosphate.

EXAMPLE 14

Using a procedure analogous to that described in Example 9, 0-methyl-0-n-hexyl-0-(2,4-dichloro-phenyl) thionophosphate was prepared from 0-n-hexyl-0,0-bis-(2,4-dichloro-phenyl) thionophosphate.

EXAMPLE 15

Using a procedure analogous to that described in Example 9, 0,0-diethyl-0-(2,4,5-trichloro-phenyl) thionophosphate was prepared from 0-ethyl-0,0-bis-(2,4,5-trichloro-phenyl) thionophosphate and ethanol.

EXAMPLE 16

Using a procedure analogous to that described in Example 9, 0-ethyl-0-isopropyl-0-(4-bromo-2,5-dichloro-phenyl) thionophosphate was prepared from 0-isopropyl-0,0-bis-(4-bromo-2,5-dichloro-phenyl) thionophosphate and ethanol.

The end products of Examples 11 through 16 were thin-layer chromatographically pure and contained no diphenyl thionophosphates corresponding to the starting compound. Their elemental analysis corresponded to the calculated values.

While the present invention has been illustrated with the aid of certain specific embodiments thereof, it will be readily apparent to others skilled in the art that the invention is not limited to the illustrative embodiments and that various changes and modifications may be made without departing from the spirit of the invention or the scope of the appended claims.

We claim:

1. A process for the preparation of a compound of the formula

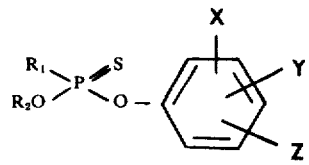

wherein
R₁ is lower alkyl, chloro-lower alkyl, phenyl, halophenyl, lower alkyl-phenyl or R—O—,
where R is alkyl of 1 to 12 carbon atoms, alkoxyalkyl of 2 to 12 carbon atoms, alkenyl of 3 to 12 carbon atoms, or (alkyl of 1 to 12 carbon atoms)—COOR', where R' is lower alkyl,
R₂ is lower alkyl,
X and Y, which may be identical or different from each other, are each hydrogen, chlorine, bromine, iodine, lower alkyl or nitro, and
Z is hydrogen, chlorine, bromine, iodine, lower alkyl, nitro, cyano, acetyl or —S(O)ₙ—R'', where R'' is lower alkyl and n is 0, 1 or 2,
which comprises subjecting a thionophosphoric or thionophosphoric acid diphenyl ester of the formula

 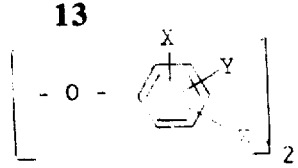

wherein $R_1$, X, Y and Z have the meanings previously defined, to an ester exchange reaction at room temperature or below with a lower alkanol of the formula $$R_2OH$$

wherein $R_2$ has the meanings defined above, in the presence of an equimolar amount of a base selected from the group consisting of alkali metal alcoholate of said lower alkanol, alkali metal hydroxides and tertiary amines.

2. A process of claim 1, wherein said base is an alkali metal alcoholate of said lower alkanol or an alkali metal hydroxide.

3. A process of claim 1, wherein said ester exchange reaction is carried out at a temperature between room temperature and $-10°C$.

4. In a process for the preparation of a compound of the formula

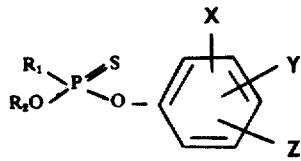

wherein
$R_1$ is lower alkyl, chloro-lower alkyl, phenyl, halophenyl, lower alkyl-phenyl or R-O,
where R is alkyl of 1 to 12 carbon atoms, alkoxyalkyl of 2 to 12 carbon atoms, alkenyl of 3 to 12 carbon atoms, or (alkyl of 1 to 12 carbon atoms)—COOR', where R' is lower alkyl,
$R_2$ is lower alkyl,
X and Y, which may be identical or different from each other, are each hydrogen, chlorine, bromine, iodine, lower alkyl or nitro, and
Z is hydrogen, chlorine, bromine, iodine, lower alkyl, nitro, cyano, acetyl or $-S(O)_n-R''$, where R'' is lower alkyl and n is 0, 1 or 2,
which comprises subjecting a thionophosphoric or thionophosphoric acid diphenyl ester of the formula

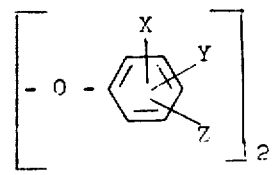

wherein $R_1$, X, Y and Z have the meanings previously defined, to an ester exchange reaction with a lower alkanol of the formula $$R_2OH$$

wherein $R_2$ has the meanings defined above, the improvement which consists in performing the transesterification at $-20°$ to $+100°C$ in the presence of gaseous ammonia.

5. A process of claim 4, wherein said transesterification is carried out with gaseous ammonia at a pressure of 3 to 5 atmospheres.

* * * * *